(12) United States Patent
Fraczek (10) Patent No.: US 9,303,707 B2
(45) Date of Patent: Apr. 5, 2016

(54) ROLLER SHADE SYSTEM AND METHOD

(71) Applicant: Ciera Industries, Inc., Valencia, CA (US)

(72) Inventor: Richard R. Fraczek, Valencia, CA (US)

(73) Assignee: Ciera Industries, Inc., Valencia, CA (US)

( * ) Notice: Subject to any disclaimer, the term of this patent is extended or adjusted under 35 U.S.C. 154(b) by 66 days.

(21) Appl. No.: 14/086,819

(22) Filed: Nov. 21, 2013

(65) Prior Publication Data

US 2015/0136337 A1     May 21, 2015

(51) Int. Cl.
| | |
|---|---|
| *E06B 9/78* | (2006.01) |
| *F16D 67/02* | (2006.01) |
| *E06B 9/42* | (2006.01) |
| *E06B 9/50* | (2006.01) |
| *E06B 9/90* | (2006.01) |

(52) U.S. Cl.
CPC . *F16D 67/02* (2013.01); *E06B 9/42* (2013.01); *E06B 9/50* (2013.01); *E06B 9/78* (2013.01); *E06B 2009/785* (2013.01); *E06B 2009/905* (2013.01)

(58) Field of Classification Search
CPC ........ E06B 9/78; E06B 9/90; E06B 2009/905
USPC ................. 160/307, 308, 292, 298, 291, 321, 160/323.1, 324–326
See application file for complete search history.

(56) References Cited

U.S. PATENT DOCUMENTS

| | | | |
|---|---|---|---|
| 4,372,432 A | 2/1983 | Waine et al. | |
| 4,433,765 A | 2/1984 | Rude et al. | |
| 4,651,854 A | 3/1987 | Harada | |
| 4,865,109 A | 9/1989 | Sherman | |
| 4,884,618 A | 12/1989 | Steeves | |
| 5,375,643 A * | 12/1994 | Rude | 160/321 |
| 5,507,374 A | 4/1996 | Rude | |
| 6,685,592 B2 | 2/2004 | Fraczek et al. | |
| 6,973,952 B2 | 12/2005 | Nien | |
| 7,380,582 B1 * | 6/2008 | Anderson et al. | 160/323.1 |
| 7,854,419 B2 * | 12/2010 | Ng et al. | 248/269 |
| 8,136,569 B2 * | 3/2012 | Bohlen et al. | 160/323.1 |
| 8,151,859 B2 * | 4/2012 | Koop et al. | 160/325 |
| 8,967,568 B2 * | 3/2015 | Wills et al. | 248/269 |
| 2004/0226663 A1 | 11/2004 | Smith et al. | |
| 2009/0258752 A1 * | 10/2009 | Bohlen et al. | 475/323 |
| 2010/0101741 A1 * | 4/2010 | Koop | 160/321 |
| 2012/0067530 A1 * | 3/2012 | Barnes et al. | 160/326 |

FOREIGN PATENT DOCUMENTS

WO    WO 2010139945 A1 * 12/2010

* cited by examiner

*Primary Examiner* — Katherine Mitchell
*Assistant Examiner* — Scott Denion
(74) *Attorney, Agent, or Firm* — Karish & Bjorgum, PC (57) ABSTRACT

An apparatus for raising and lowering a window shade having: a clutch assembly with a clutch core having a shaft; springs having pairs of load bearing members, the springs being circumferentially positioned along a length of the shaft, the pairs of load bearing members being circumferentially spaced around the shaft such that there are no two orthogonal planes along a longitudinal axis of the shaft about which a load applied to a load bearing member of each pair is symmetrically distributed; a pulley defining openings, each of the openings being configured to receive at least one pair of load bearing members; and a housing comprising a plurality of keys, each key being configured to fit between at least one pair of load bearing members received by the openings.

14 Claims, 9 Drawing Sheets

ROLLER SHADE SYSTEM AND METHOD

BACKGROUND OF THE INVENTION

This invention relates generally to window covering hardware and, more specifically, to a roller shade system for raising and lowering a roller shade.

A number of different systems for raising and lowering shades are in use today in the window covering industry. Typically, the systems include a roller coupled to a clutch controlled with a cord or chain. Opposite to the clutch is an idler. The idler and clutch are typically suspended on brackets mounted to a window frame. A clutch bracket typically engages a feature on the clutch strong enough to hang a shade. An idler bracket typically rotatably engages the idler, allowing the idler to rotate with the shade while holding the idler and the shade in place.

Typically the clutch consists of a cylindrical shaft, pulley and a housing as well as a torsion spring. The torsion spring provides a force necessary to hold the weight of the shade in place. The spring is placed on the shaft and the pulley is placed over the spring and the shaft. Both ends of the spring are bent and the pulley engages the bent ends of the spring. Rotation of the pulley expands the spring allowing the spring to slip over the shaft. The housing is placed over the pulley and has keys engaging the spring in opposite directions. Rotation of the housing contracts the spring preventing the spring from rotating.

In prior art clutch designs, the load on the spring was either concentrated on one side, or was distributed symmetrically between pairs of springs located on opposite sides of the shaft. Both designs have shortcomings. In a system using a clutch with one spring, a load on the bent spring ends changes the position of the bent portions relative to the shaft. The load is smallest when the spring is rotating down and largest when rotating up. This uneven load distribution during rotation causes uneven friction and uneven effort to operate the shade. In a system using a clutch with symmetrical spring orientation, much higher forces are required to rotate the springs if the bent portions of the opposing springs are in a vertical plane. Additionally, the use of an even number of springs creates a cancelling moment that requires added force to overcome. Thus, a force required to raise and lower the shade varies depending upon the position of the springs and corresponding tangs. Such variations inhibit smooth raising and lowering of the shade.

Prior roller shade systems suffered from other defects, such as wobbly or hard to connect clutch and idler brackets. Moreover, prior roller shade systems are difficult to mount level and if mounted even slightly out of level may lead to obviously misaligned shades when the shades are lowered.

Accordingly, there is a need for an improved roller shade system that remedies the shortcomings of the prior art.

SUMMARY OF THE INVENTION

The present invention is directed to improvements over prior art roller shade systems, and provides for smoother operation with less friction, thus requiring less force by a user.

It is an object of this invention to provide a window shade assembly with better engagement between the clutch and the clutch bracket.

It is also an object of this invention to provide an improved and more efficient torsion spring clutch assembly.

It is also an object of this invention to provide a multiple torsion spring clutch with reduced bearing loads.

It is also an object of this invention to provide a better way of engaging an idler in an idler bracket, as well as to provide adjustability to the idler bracket allowing for easy height adjustment of the idler.

An apparatus for raising and lowering a window shade, according to an embodiment of the present invention has a clutch assembly with a clutch core. The clutch core has a shaft; a plurality of springs with pairs of load bearing members, the plurality of springs being circumferentially positioned along a length of the shaft. The pairs of load bearing members are circumferentially spaced around the shaft such that there are no two orthogonal planes along a longitudinal axis of the shaft about which a load applied to a load bearing member of each pair is symmetrically distributed. The clutch core also has a pulley defining openings, each of the openings being configured to receive at least one pair of load bearing members. The clutch core also has a housing with a plurality of keys, each key being configured to fit between at least one pair of load bearing members received by the openings.

The apparatus may have at least three springs. An angle formed at an axis by adjacent pairs of load bearing members may be no more than about 120 degrees. In an embodiment, an angle formed at the axis by adjacent pairs of load bearing members is about 72 degrees. In an embodiment, a load from the window shade applied to at least one load bearing member of each pair during rotation of the pulley is substantially the same regardless of the position of the load bearing member around the shaft such that the shade may be rotated at a constant rate in response to a constant force.

Optionally, the apparatus has a clutch bracket with a plurality of mounting holes configured at an angle relative to each other; and the clutch core has an outward facing side opposite the shaft comprising at least two hooks configured to fit in the mounting holes, each of the hooks comprising an undercut portion configured to hold the clutch core in the bracket after insertion of the hooks in the mounting holes. The hooks may be positioned above a midline of the clutch core. The clutch core may also have a bridge and the clutch bracket may also have at least one mounting slot configured to receive the bridge. The clutch bracket may also have a rotatable arm configured to fit in the bridge after the bridge has been received in the mounting slot to lock the clutch core to the clutch bracket. Optionally, the clutch bracket has a plurality of notches and the rotatable arm has a bend and the is configured so that the bend engages one of the plurality of notches when the arm is placed in the bridge after the bridge has been received in the mounting slot.

In an embodiment, the apparatus for raising and lowering a window shade has a tube with a first side and a second side. The clutch assembly is mountable in the first of the tube. An idler assembly is mountable in the second side of the tube. The idler assembly has an idler housing; and an idler shaft mountable in the idler housing, the idler shaft having a rounded portion. The idler bracket has a carrier configured to receive the rounded portion. According to an embodiment, the idler shaft has a plurality of hooks positioned on an end of the shaft opposite the rounded portion, the hooks being oriented toward a central longitudinal axis of the idler shaft. The idler assembly has an idler spring positioned around the idler shaft and the idler housing has a plurality of deflectors. The idler shaft is insertable into the housing such that the hooks move past the deflectors to lock the idler shaft in the idler housing; and the idler spring in combination with the hooks maintains the idler shaft in the idler housing even if one or more of the deflectors is broken off of the housing.

In an embodiment the idler bracket further comprises an adjuster for adjusting the carrier. Optionally, the idler bracket has a tool retainer and the apparatus may have a tool configured to manipulate the adjuster. In an embodiment, the adjuster is a hex head screw and the tool is an hex key. In an additional embodiment, the apparatus further comprises an engaging member coupleable to the pulley, the engaging member having a stop; and wherein the clutch assembly further comprises a landing configured to correspond to the stop.

The present invention, according to an embodiment is also directed to an apparatus for raising and lowering a window shade comprising: a clutch bracket comprising: a plurality of mounting holes configured at an angle relative to each other; at least one mounting slot configured to receive the bridge; and a rotatable arm. The apparatus further comprises a clutch assembly further comprising: a clutch core comprising a shaft and an outward facing side opposite the shaft, the outward facing side comprising at least two hooks and a bridge; a plurality of springs comprising pairs of load bearing members, the plurality of springs circumferentially positioned along a length of the shaft, the pairs of load bearing members being circumferentially spaced around the shaft such that there are no two orthogonal planes along a longitudinal axis of the shaft about which a load applied to a load bearing member of each pair is symmetrically distributed; a pulley defining openings, each of the openings being configured to receive at least one pair of load bearing members; and a housing comprising a plurality of keys, each key being configured to fit between at least one pair of load bearing members received by the openings. The apparatus further comprises an engaging member coupleable to the pulley; a tube having a first side mountable to the clutch assembly and a second side.

The apparatus further comprises an idler assembly mountable in the second side of the tube, the idler assembly further comprising: an idler housing comprising a plurality of deflectors; an idler shaft mountable in the idler housing, the idler shaft comprising a rounded portion and a plurality of idler hooks positioned on an end of the shaft opposite the rounded portion, the idler hooks oriented toward a central longitudinal axis of the idler shaft; and an idler spring positioned around the idler shaft. The apparatus further comprises: a carrier configured to receive the rounded portion; an adjuster for adjusting the position of the carrier; and a tool retainer; and a tool for adjusting the adjuster.

The at least two hooks are configured to fit in the mounting holes, each of the hooks comprising an undercut portion configured to hold the clutch core in the bracket after insertion of the hooks in the mounting holes. The arm is configured to fit in the bridge after the bridge has been received in the mounting slot to lock the clutch core to the clutch bracket. The idler shaft is insertable into the housing such that the idler hooks move past the deflectors to lock the idler shaft in the idler housing. The idler spring in combination with the hooks maintains the idler shaft in the idler housing even if one or more of the deflectors is broken off of the housing.

The hooks may be positioned above a midline of the clutch core. Optionally, the adjuster is a hex head screw and the tool is a hex key. The apparatus may also have a window covering coupled to the tube.

BRIEF DESCRIPTION OF THE DRAWINGS

The features, aspects and advantages of the present invention will become better understood with regard to the following description, appended claims and accompanying figures wherein:

DETAILED DESCRIPTION OF THE PREFERRED EMBODIMENTS

In the following description of the preferred embodiments, reference is made to the accompanying drawings which show by way of illustration specific embodiments in which the invention may be practiced. Wherever possible, the same reference numbers will be used throughout the drawings to refer to the same or like parts. It is to be understood that other embodiments may be utilized and structural and functional changes may be made without departing from the scope of the present invention.

Figure 1:
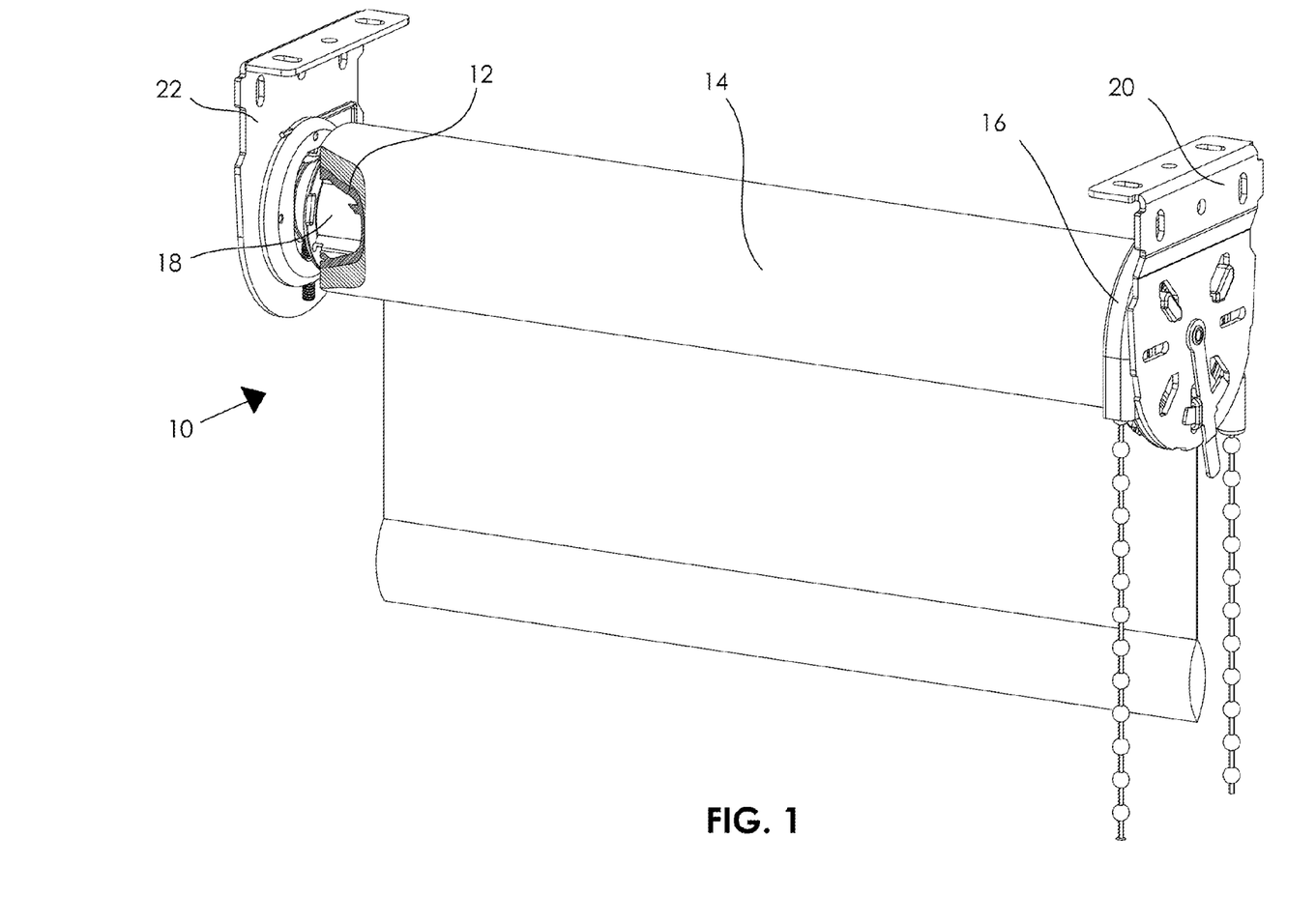
FIG. 1 is a side perspective view of a roller shade system according to an embodiment of the present invention.

With reference to FIG. 1, the present invention, according to an embodiment, is directed to a roller shade system 10 for lifting and lowering a roller shade. The system includes a tube 12 for holding a shade 14. A clutch assembly 16 is mated to a first side of the tube 12 and an idler assembly 18 is mated to a second side of the tube 12. The clutch assembly 16 is connectable to a clutch bracket 20. The idler assembly 18 is rotatably connectable to an idler bracket 22. The various components of the system will now be described in more detail.

Clutch Assembly

The clutch mechanism described herein operates on the principle that lifting and lowering of window shades with minimum friction and force may be achieved by a clutch having multiple pairs of load bearing members circumferentially spaced around a shaft of the clutch at substantially equal angular increments such that there are no two orthogonal planes along a longitudinal axis of the shaft about which a load from the window shade is symmetrically distributed. Distribution of the load in this manner allows the load to be more evenly distributed around the shaft, thereby reducing variations in friction and in turn the force required to raise and lower the window shade. As a result, the window shade may be smoothly raised or lowered at a constant rate in response to a constant force.

The term "smoothly" or "smooth" as used in reference to raising or lowering of the window shade generally refers to an ability to raise the window shade with minimal effort due to a substantially constant or even rate of rotation of the clutch that is substantially uninterrupted or otherwise affected by mechanical constraints such as frictional variations, load bearing member positioning and uneven load distributions.

FIGS. 2 to 6 show a clutch assembly 16 according to an embodiment of the present invention. The clutch assembly 16 includes a plurality of torsion springs 24, 26, 28 asymmetrically positioned around a shaft 30 of a clutch core 32. A pulley 34 fits over the torsion springs 24, 26, 28 and the shaft 30. A housing 36 fits over the pulley 34. The pulley 34 and the housing 36 are coupled to the clutch core 32 to maintain the clutch assembly components in a predetermined relationship. The shaft 30 is a stationary member and the pulley 34 rotates freely about the shaft.

Figure 2:
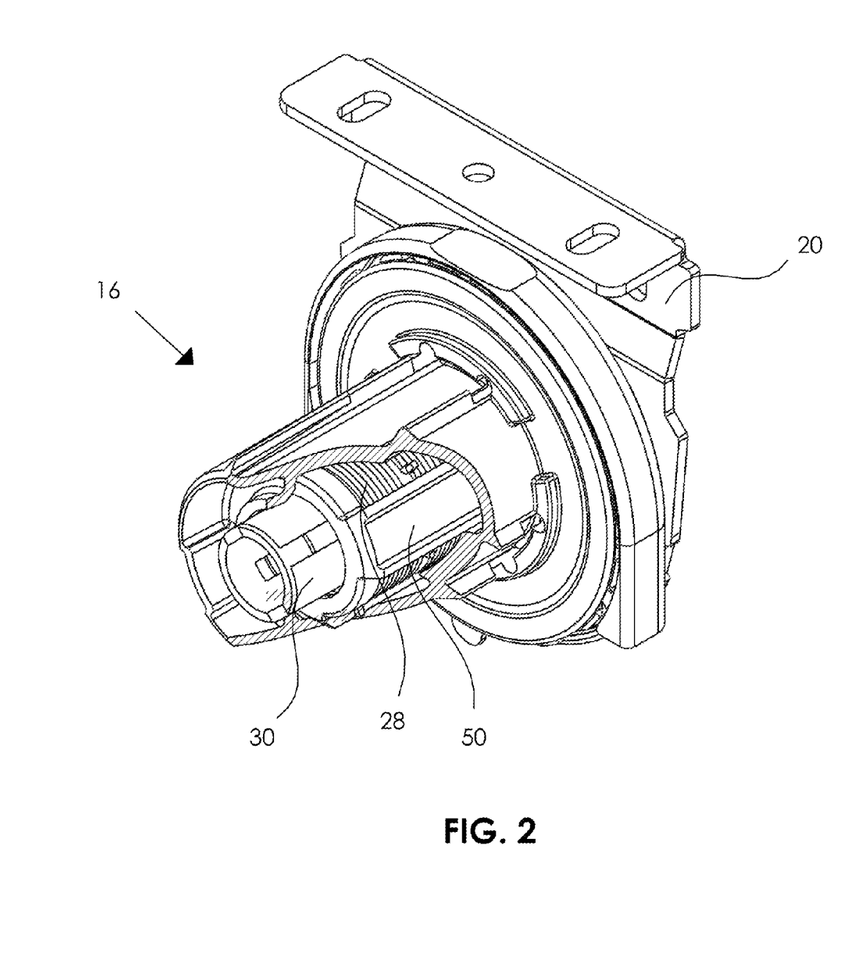
FIG. 2 is a side perspective view of a clutch assembly according to an embodiment of the present invention with the housing partially cut away to show inner components of the system.

The shaft 30 may be substantially cylindrical in shape and may have any diameter and length suitable for supporting components of the clutch assembly 16 and the shade 14. In embodiments, the shaft 30 has a diameter of from about ½ inch to about 3 inches and a length of from about 1 inch to about 4 inches. A slightly smaller diameter may be provided at an end of the shaft 30 to facilitate securing of components to the shaft 30 as described below. The shaft 30 may be of any material suitable for supporting components of the clutch assembly 16 and the window shade 14. For example, the shaft 30 may be made of plastic or metal. Preferably, the shaft material should be a lightweight material so as not to add unnecessary weight to clutch 30.

The springs 24, 26, 28 are circumferentially positioned along a length of the shaft 30. The springs 24, 26, 28 may have a series of helical turns that may be positioned around the shaft 30. In an embodiment, in a normal state (e.g. non-expanded), the springs 24, 26, 28 may have a normal inner diameter substantially the same as or smaller than the diameter of the shaft 30.

Each spring 24, 26, 28 may be coiled around the shaft 30 by applying a force to ends of the spring in a direction that causes the spring to expand, thereby increasing the inner diameter, and then inserting the spring over the shaft 30. Once in position, the spring may be released so that the spring contracts, thereby gripping the shaft 30, and preventing rotation of the spring. The springs 24, 26, 28 may be made of any resilient material capable of being secured to the shaft 30 and supporting a load, including, but not limited to a metal. Preferably, the springs have only a few turns to minimize friction and at the same time give the clutch adequate holding capacity.

Pairs of load bearing members 38, 40, 42, 44, 46, 48 extend from ends of springs 24, 26, 28 respectively. In an embodiment, the load bearing members extend radially outward from a circumference of each spring 24, 26, 28 such that the load bearing members are generally perpendicular to a lengthwise or longitudinal axis of the spring. In an embodiment, the load bearing members are tangs formed at opposite ends of the spring.

Alternatively, the load bearing members may have any structure deemed suitable for providing a surface area for engagement by the pulley 34. The pulley 34 engages one of the load bearing members of each of the springs 24, 26, 28 to apply a force in a first (e.g. clockwise) direction and engages the other load bearing member of each springs to apply a force in an opposite direction to expand each spring. The springs 24, 26, 28 require only a few turns to minimize the friction between the springs and the shaft 30 and at the same time give the clutch maximum holding capacity during operation.

The load bearing members of the springs are asymmetrically positioned around the shaft 30. The term "asymmetrically" or "asymmetric" as used herein generally refers to the positioning of the pairs of load bearing members around the shaft 30 such that there are no two orthogonal planes along the longitudinal axis of the shaft 30 about which the pairs of load bearing members, and in turn a load applied to a load bearing member, are symmetrical. Representatively, where three springs are wrapped around the shaft 30, an angle formed by adjacent pairs of load bearing members is no more than about 120 degrees, such that a load applied to at least one load bearing member is asymmetrically distributed around the shaft 30.

An angle formed between adjacent pairs of load bearing members varies inversely to the number of load bearing member pairs distributed around the shaft 30. For example, where springs and therefore five pairs of load bearing members are positioned asymmetrically around the shaft 30, an angle formed between adjacent pairs of load bearing members is 72 degrees. Preferably, an odd number of springs is preferred over an even number because an even number may create a canceling moment in which rotation of one pair of load bearing member pairs cancels out a rotation of another pair of diametrically opposed load bearing member pairs. An additional force must be applied to overcome this canceling effect. Alternatively, where an even number of load bearing member pairs are used, a tension of the corresponding springs and/or angular orientation of the pairs around the shaft may be modified to reduce any canceling effects.

The pulley 34 is positioned over the shaft 30 for rotating components of the clutch assembly 16. The pulley 34 may include a cylindrical member 50 positioned over the shaft 30. The pulley 34 may have an internal surface that minimizes frictional forces between the pulley and the underlying springs 24, 26, 28 such that the pulley rotates freely about the shaft 30. The pulley 34 may also include striations (i.e. narrow grooves or channels) formed along an inner surface parallel to a direction of rotation of the pulley 34 around the shaft 30. The pulley 34 may be of a similar material to the shaft 30.

Figure 4:
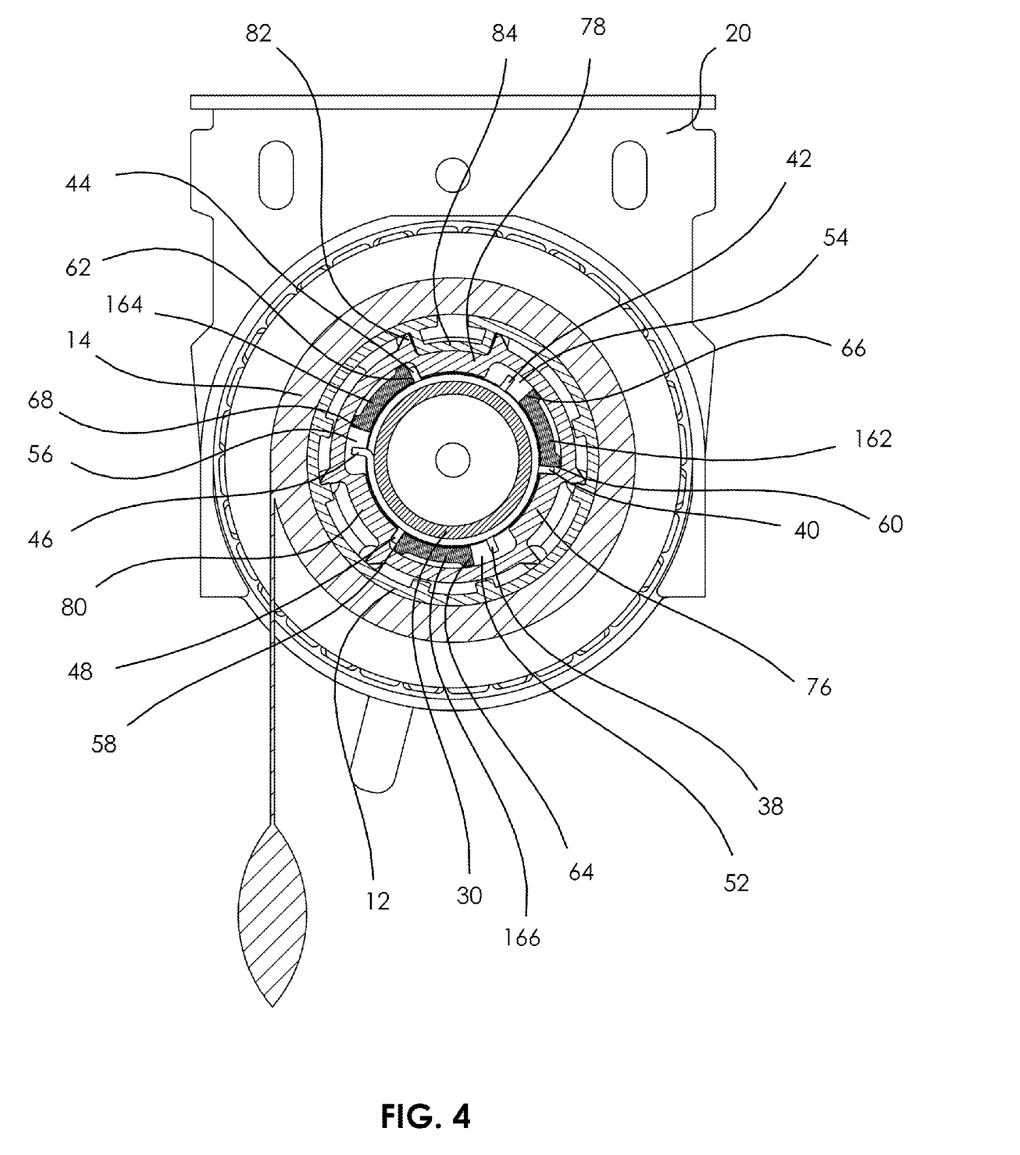
FIG. 4 is a cross sectional view of the clutch assembly and clutch bracket of FIG. 3 taken along line A-A.

The pulley 34 includes openings 52, 54, 56 dimensioned to receive the load bearing member pairs 38 and 40, 42 and 44, and 46 and 48 respectively, when the pulley 34 is positioned over the shaft 30. The openings 52, 54, 56 may be asymmetrically positioned within the pulley 30 to correspond to the asymmetrically positioned pairs of load bearing members 38 and 40, 42 and 44, and 46 and 48. As will be described in more detail in reference to FIG. 4, portions of each opening 52, 54, 56 are defined by first drive edges 58, 60, 62 and second drive edges 64, 66, 68 which extend along a length of the cylindrical member 50 of the pulley 34. Depending on a direction of rotation of the pulley 34, first drive edges 58, 60, 62 or second drive edges 64, 66, 68 may contact a load bearing member of each pair to expand the corresponding spring thereby allowing for rotation of the springs 24, 26, 28 in the same direction as the pulley 34. Although three openings 52, 54, 56 are illustrated in FIG. 4, it is contemplated that the pulley 34 may include more than three openings to correspond to the number of springs.

The housing 36 is positioned over the cylindrical member 50 of the pulley 34. The housing 36 may have any shape and dimensions suitable for fitting over the cylindrical member 50. The housing 36 may have a cylindrical portion 70, the cylindrical portion having a length substantially the same as the shaft 30. The cylindrical portion 70 has a reduced diameter portion such that the cylindrical portion may engage detents 71 provided on the shaft 30.

The housing 36 has keys 76, 78, 80 extending radially inward from housing 36. During rotation of the pulley 36, the keys 76, 78, 80 may engage a load bearing member of each spring, so that the housing 36 may rotate along with the pulley 34. Once rotation stops, the keys 76, 78, 80 may engage the opposite load bearing member of each spring to lock the springs to the shaft 30. The keys 76, 78, 80 may extend along a length of the housing 36 and be circumferentially spaced around the housing 36 such that each key 76, 78, 80 corresponds to at least one of the pulley openings 52, 54, 56. Representatively, the housing 36 illustrated in FIG. 3 has three keys 76, 78, 80 positioned such that an angle formed at a longitudinal axis of the housing 36 by adjacent sets of keys is 120 degrees.

Figure 3:
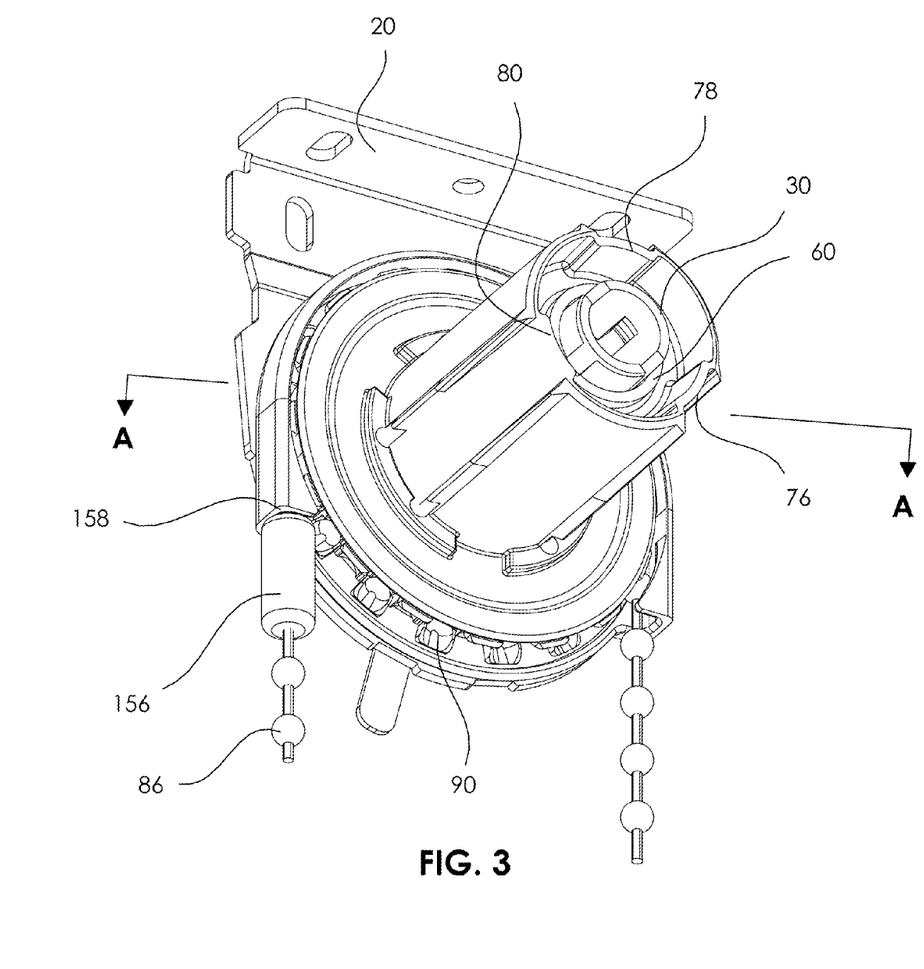
FIG. 3 is a bottom perspective view of the clutch assembly and clutch bracket of FIG. 2.

The keys 76, 78, 80 may have a width substantially smaller than a width of the pulley openings 52, 54, 56 and a distance between each pair of load bearing members of each spring. In an embodiment, the openings 52, 54, 56 have a width of about ⅝ inches, a distance between the load bearing members positioned in each opening is about ½ inches, and the keys 76, 78, 80 have a width of about 3/16 inches. In this embodiment, the load bearing members within the pulley openings are close to the first and second drive edges yet far enough apart for the housing keys to fit in between the load bearing members. Thus, there is enough room between first and second drive edges of the pulley 34 and the keys to allow for rotational movement of each component before engaging each other. Without sufficient space between each key and corresponding drive edges, the springs will not be able to expand, thus preventing rotation of the springs and locking the window shade in position. Ribs 82 may extend radially outward from the housing 36 along each side of the keys 76, 78, 80.

The pulley 34 and the housing 36 are designed to slip fit over the shaft 30 and over each other. The springs are designed to cause interference with the shaft 30 and need to be expanded to fit around the shaft 30. Thus, application of a force to one side of the load bearing members in a direction toward the corresponding load bearing member causes the spring to expand and an oppositely directed force applied to the other side of the load bearing members causes the spring to tighten on the shaft 30. Each load bearing member associated with an expanded spring may rotate freely until it comes to rest against a side of one of the keys 76, 78, 80.

The window shade 14 is wrapped around the tube 12. The tube 12 has protrusions 84 configured to fit between ribs 82 of the housing 36 thereby securing the window shade 14 to the housing 36. A load from the window shade 14 is distributed between each pair of load bearing members 38 and 40, 42 and 44, and 46 and 48. An engaging member 86 is mounted around a sprocket 88 of the pulley 34. The engaging member 86 may be, for example, a string or a chain. In an embodiment, the sprocket 88 has a plurality of teeth 90. However, in alternative embodiments, the sprocket may have an annular detent for retaining the engaging member 86 around the sprocket 88.

Pulling on the engaging member 86 results in rotation of the pulley 34. The pulley 34 deflects one of the load bearing members of each spring forcing the springs to expand slightly and rotate in the direction of pulley rotation. The load bearing members rotate freely until the load bearing members come to rest against the side of the housing keys 76, 78, 80. Continued pulling on the engagement member 86 results in rotation of the pulley 34, springs 24, 26, 28 and housing 36 and consequently results in raising or lowering of the shade 14 attached to the tube 12. Rotation continues as long as sufficient force is applied to the engagement member 86. Once pulling on the engaging member 86 ceases, the window shade 14 stops in place because the window shade 14 weight forces rotation of the keys 76, 78, 80 to engage the load bearing members and force the springs to contract and lock on the shaft 30.

Since each spring carries part of the weight of the shade 14, the more springs that are used in the clutch assembly 16, the smaller the load each load bearing member has to carry. In addition, the asymmetrical positioning of pairs of load bearing members 38 and 40, 42 and 44, and 46 and 48 as illustrated in FIG. 4, ensures that during operation of the clutch assembly 16, minimal frictional variations occur such that the window shade 14 may be smoothly raised or lowered by applying a constant force on the engagement member 86 regardless of the position of the load bearing members 38 and 40, 42 and 44, and 46 and 48 during rotation around the shaft 30.

In determining the number of openings it is considered that each of the openings must have a sufficient width to allow for movement of the pairs of load bearing members and housing keys received therein. Thus the number of openings may be limited by a diameter of the shaft 30 and in turn the pulley 34. For example, in one embodiment, where a diameter of the shaft 30 is three inches and the pulley 34 has a slightly larger diameter to fit over the shaft 30, the pulley 34 may include five or seven openings. Where five openings are included, at least five springs having corresponding pairs of load bearing members may be positioned around the shaft 30 such that at least one load bearing member pair is positioned within each opening.

Alternatively, in an embodiment where a diameter of the pulley 34 is about ½ inch, it is contemplated that for openings to have the proper dimensions, less than five openings, for example, three openings may be formed in the pulley 34. It is further contemplated that more than one pair of load bearing members may be received by each opening. For example, where six springs are provided and the pulley 34 includes three openings, two pairs of load bearing members may be received by each opening. Alternatively, any number of load bearing member pairs may be received by any number of opening so long as each opening receives at least one load bearing member pair.

The pulley openings may be distributed asymmetrically around the cylindrical member 50 of the pulley 34 to receive the load bearing members which are asymmetrically distributed about the shaft 30. To achieve this, any number of openings according to the formula N+2 where N is an odd integer may be distributed at equal angular intervals around the cylindrical member 50. Representatively, there may be three openings 52, 54 and 56, and an angle formed at a longitudinal axis of the cylindrical member 50 from a point midway between a first drive edge and a second drive edge defining each opening of adjacent openings may be about 120 degrees. Alternatively, where five openings are provided, the angle formed by each adjacent load bearing member pair may be about 72 degrees. Similarly, a number of keys may be positioned around the housing 36 corresponding to each opening 52, 54 and 56 of the pulley 34.

Improved Clutch Mounting

Figure 5:
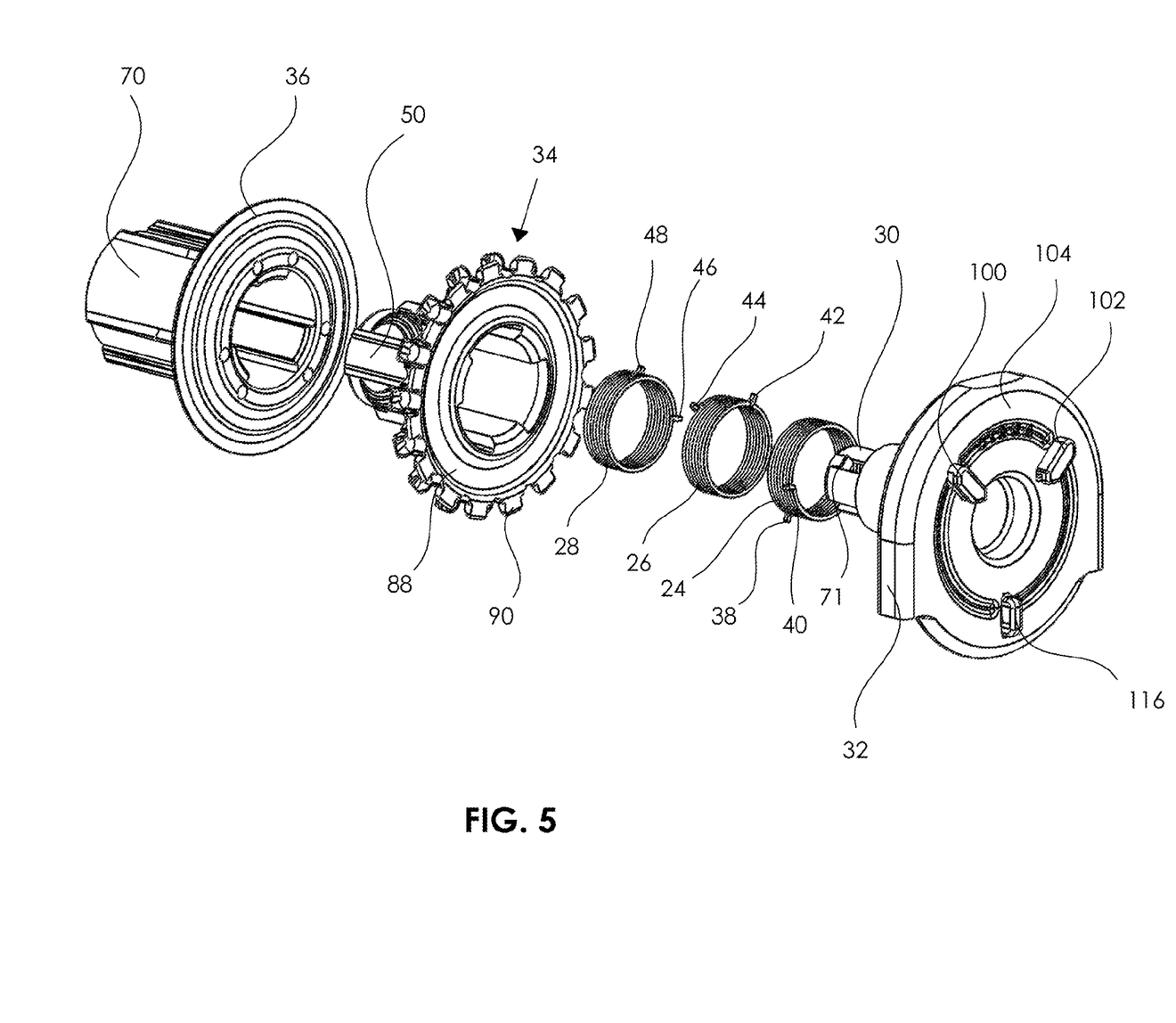
FIG. 5 is an exploded rear perspective view of the clutch assembly of FIG. 2.
Figure 6:
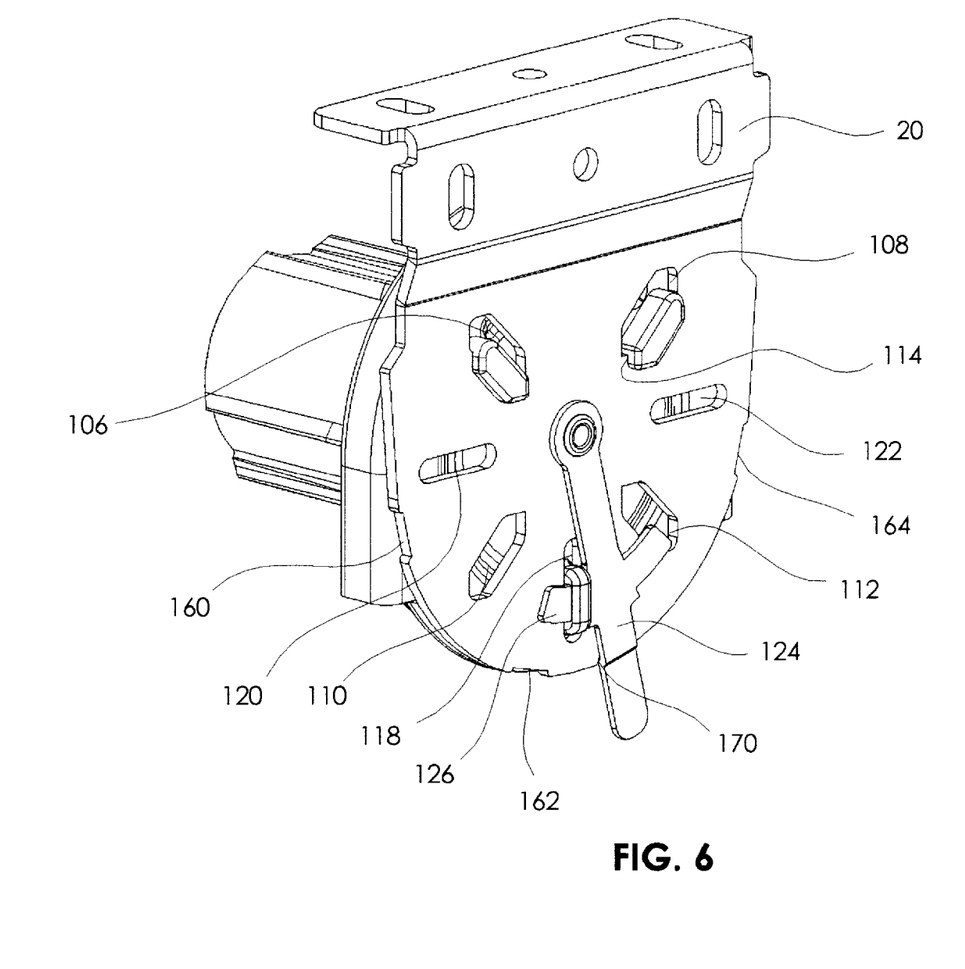
FIG. 6 is a rear perspective elevation view of the clutch assembly and clutch bracket of FIG. 2.
Figure 7:
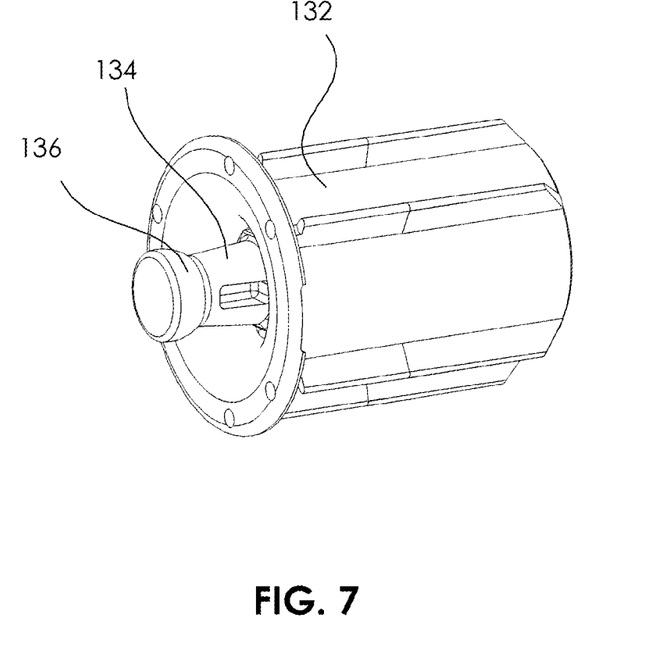
FIG. 7 is a front perspective view of an idler assembly according to an embodiment of the present invention.

FIGS. 5 and 6 show a clutch mounting system according to an embodiment of the present invention. The clutch core 32 has two hooks 100, 102 on a back side 104. In an embodiment, the hooks 100, 102 are above a center of the clutch core 32 to make installation easier. The hooks 100, 102 are placed above the center and at an angle. Placing the hooks 100, 102 at an angle is advantageous, because the hooks are self-centering. Preferably, the hooks 100, 102 are "V"-shaped to allow the weight of the shade to force the clutch core 32 to its lowest position on the clutch bracket 20, preventing the clutch assembly 16 from moving side to side during operation.

The clutch bracket 20 may be mounted, for example, to a ceiling or a wall. The clutch hooks 100, 102 fit in two mounting holes 106, 108 in the clutch bracket 20. The mounting holes 106, 108 are configured to have angles corresponding to the angles of the clutch hooks 100, 102. The clutch bracket 20 may have a additional mounting holes 110, 112 configured so that regardless of ceiling or wall installation, the clutch assembly 16 can be vertically mounted. Each of the hooks 100, 102 has an undercut portion 114. Once the hooks 100, 102 are inserted in the mounting holes 106, 108, the hooks 100, 102 rest on the undercut portions 114 and the clutch core 32 is thereby retained by the clutch bracket 20.

The back side 104 of the clutch core 32 also has a bridge 116. The clutch bracket 20 has a mounting slot 118 configured to receive the bridge 116. The clutch bracket may have additional mounting slots 120, 122 so that regardless of ceiling or wall installation, the clutch assembly can be vertically mounted. The clutch bracket 20 also has a latch 124 with an arm 126. The latch 124 is rotatably coupled to the clutch bracket 20. The clutch bracket 20 and the latch 124 are configured so that the latch may be engaged by a user and rotated after the clutch bracket has been mounted to a surface. In an embodiment, when the hooks 100, 102 are engaged in the mounting holes 106, 108, the bridge 116 is engaged in the mounting slot 118 and protrudes from the clutch bracket 20 forming an opening sufficient for the latch arm 126 to be rotated through. Once the arm 126 is positioned between the bridge and the bracket slot, the clutch core 32 cannot move and remains positively engaged to the clutch bracket 20.

In an embodiment, as shown in FIG. 6, the clutch bracket has a plurality of notches, 160, 162 and 164 and the latch 124 has a bend 170. The bend 170 and notches function as detents. When the latch arm 126 is positioned between the bridge 116 and one of the bracket slots, the bend 170 engages with one of the notches to prevent accidental rotation of the latch an disengagement of the arm 126 from between the bridge and the bracket slot.

Improved Idler and Bracket

The end of the shade opposite the clutch assembly 16 terminates with the idler assembly 18. Construction of the idler assembly 18 is shown in FIGS. 7 to 10. The idler assembly 18 is a spring loaded mechanism with an idler spring 130, idler housing 132 and an idler shaft 134 with a rounded portion 136 on an end. The shade may rest on the rounded portion 136 while the shade is being installed. This is very advantageous, because spring loaded idlers typically used in shade installation are terminated with a straight shaft. A straight shaft tends to slide out of the idler bracket during installation and substantial force is needed to hold the straight shaft in the bracket to install the shade. The rounded portion 136 may be easily rested on the idler bracket 22 even at a steep angle without force required to hold the rounded portion in the idler bracket.

Figure 8:
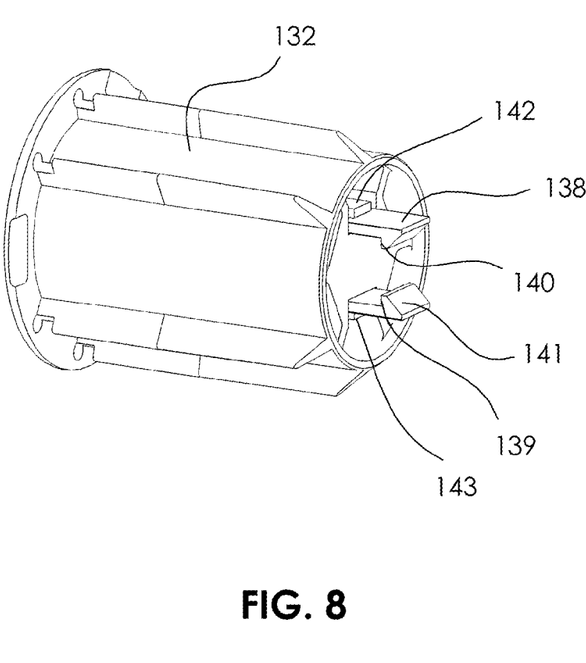
FIG. 8 is a rear perspective elevation view of the idler of FIG. 7.

Opposite the rounded portion 136, the idler shaft 134 is terminated with two spears 138, 139 with idler hooks 140, 141 on the ends facing each other as shown in FIG. 8. During idler assembly, the idler shaft 134 is forced into the idler housing 132. As the idler shaft 134 is inserted into the idler housing 132, the idler hooks 140 push deflectors 142, 143 on the idler housing 132 to allow the idler hooks 140 to pass through the end of the housing. Once inserted through the housing, the deflectors 142, 143 return to a locking position and the idler hooks 140 prevent the idler shaft 134 from being pulled back out of the idler housing 132.

Facing the idler hooks 140 inward is an improvement over prior idler assembly designs, because if one or both deflectors 142,143 break off during assembly, use or shipping, the idler hooks still have a solid housing surface to rest on and the idler spring 130 keeps the idler hooks resting against the housing and the shaft from being pulled back through the idler housing 132. If the idler hooks were placed facing outward, then a broken deflector would allow the idler hooks to recede into the idler housing, thereby causing the shaft to lose tension and fail to function properly.

Figure 9:
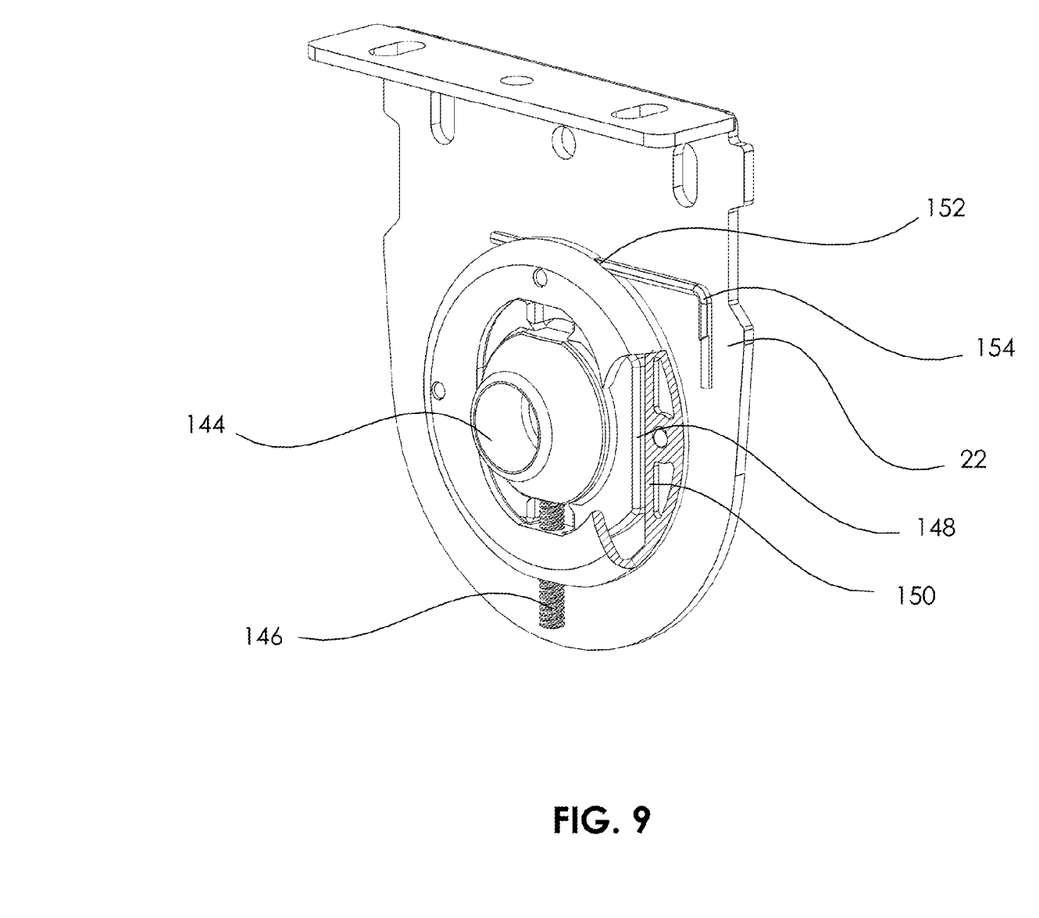
FIG. 9 is a front perspective view of the idler bracket according to an embodiment of the present invention.
Figure 10:
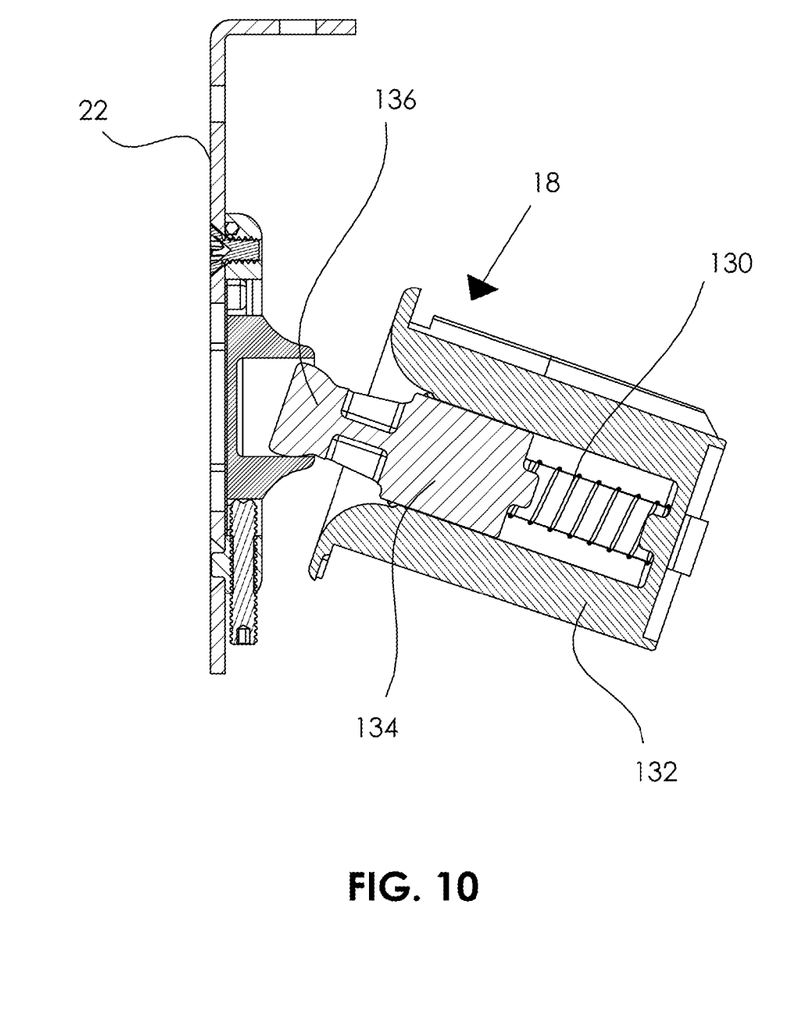
FIG. 10 is a cross section view of the idler assembly FIG. 7 resting on the rounded portion of the idler shaft during installation.

The idler bracket 22, according to an embodiment as shown in FIGS. 9, 10, has an adjustable carrier 144 to receive the rounded portion 136 of the idler shaft 134. The carrier 144 may be easily repositioned for wall or ceiling installation. An adjuster 146, such as a set screw, placed below the carrier 144 may be used to adjust the position of the carrier. Proper positioning of the carrier 144 is maintained by a carrier side wall 148 which runs parallel to and fits against an inner wall 150 of the idler bracket 22.

Often the clutch bracket 20 and the idler bracket 22 are not installed in perfectly level positions which may cause the shade to slide to the side during raising or lowering. With the idler bracket 22 according to an embodiment of the present invention, a position of the carrier 144 can be easily leveled by adjusting the adjuster 146 in or out instead of removing the idler bracket 22 and leveling the position of the idler bracket with shims, which can be time consuming and inconvenient. In an embodiment of the present invention, the idler bracket 22 or the carrier 144 has a tool retainer 152, such as a hole or bracket, for holding a tool 154 for adjusting the adjuster 146. In an embodiment, the adjuster 146 is a set screw adjustable with an hex key, the tool 154 is an hex key and the tool retainer 152 is sized to removably hold the hex key. Maintaining the tool 154 in the idler bracket 22 allows for easy future shade adjustment and provides easy access and storage.

Improved Chain Landing

FIG. 3 shows a bead chain engaging member 86 according to an embodiment of the present invention. The engaging member 86 has a stop 156. The stop 156 may be any suitable shape, such as a ball, and is affixed to the bead chain at a point to limit movement of the bead chain and thereby limit rotation of the clutch to prevent breakage of the clutch or other components, such as when the blind is fully raised. The clutch core 32, according to an embodiment of the present invention has a landing 158 corresponding to the shape of the stop 156. Configuring the landing 158 to the shape of the stop 156, prevents the stop from damaging the clutch core 32 or other clutch components and also prevents damage to the stop when the engaging member is subjected to large forces during blind raising. Additionally, configuring the landing 158 to the shape of the stop 156, prevents the stop, and the engaging member, from resting at an unsightly angle from the clutch core 32.

There is disclosed in the above description and the drawings, a roller shade system which fully and effectively overcomes the disadvantages associated with the prior art. However, it will be apparent that variations and modifications of the disclosed embodiments may be made without departing from the principles of the invention. The presentation of the preferred embodiments herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. §112.

What is claimed is:

1. An apparatus for raising and lowering a window shade comprising:
   a clutch assembly further comprising:
      a clutch core having a shaft;
      a pulley;
      a clutch bracket comprising a plurality of mounting holes configured at an angle relative to each other;
      wherein the clutch core has an outward facing side opposite the shaft comprising at least two hooks at an angle relative to each other configured to fit in the mounting holes, each of the hooks comprising an undercut portion configured to hold the clutch core in the bracket after insertion of the hooks in the mounting holes;
wherein the clutch core further comprises a bridge;
the clutch bracket further comprises:
at least one mounting slot configured to receive the bridge; and
a rotatable arm; and
wherein the arm is configured to fit in the bridge after the bridge has been received in the mounting slot to lock the clutch core to the clutch bracket.

2. The apparatus of claim 1 wherein the hooks are positioned above a horizontal midline of the clutch core.

3. The apparatus of claim 1 wherein:
the clutch bracket further comprises a plurality notches; and
the rotatable arm further comprises a bend; and
wherein the arm is configured so that the bend engages one of the plurality of notches when the arm is placed in the bridge after the bridge has been received in the mounting slot.

4. The apparatus of claim 1 further comprising:
a tube having a first side mountable to the clutch assembly and a second side;
an idler assembly mountable in the second side of the tube, the idler assembly further comprising:
an idler housing; and
an idler shaft mountable in the idler housing, the idler shaft comprising a rounded portion; and
an idler bracket further comprising a carrier configured to receive the rounded portion.

5. The apparatus of claim 4 wherein:
the idler shaft further comprises a plurality of hooks positioned on an end of the shaft opposite the rounded portion, the hooks oriented toward a central longitudinal axis of the idler shaft;
the idler assembly further comprises an idler spring positioned around a portion of the idler shaft;
the idler housing further comprises a plurality of deflectors;
the idler shaft is insertable into the housing such that the hooks move past the deflectors to lock the idler shaft in the idler housing; and
wherein the idler spring in combination with the hooks maintains the idler shaft in the idler housing.

6. The apparatus of claim 5 wherein the idler bracket further comprises an adjuster for adjusting the carrier.

7. The apparatus of claim 6 wherein the idler bracket further comprises a tool retainer.

8. The apparatus of claim 7 wherein the apparatus further comprises a tool configured to manipulate the adjuster.

9. The apparatus of claim 8 wherein the adjuster is a hex head screw and the tool is a hex key.

10. The apparatus of claim 1 further comprising an engaging member coupleable to the pulley, the engaging member further comprising a stop; and wherein the clutch assembly further comprises a landing configured to correspond to the stop.

11. An apparatus for raising and lowering a window shade comprising:
a clutch assembly further comprising:
a clutch core comprising a shaft and an outward facing side opposite the shaft, the outward facing side comprising at least two hooks at an angle relative to each other and a bridge;
a clutch bracket comprising:
a plurality of mounting holes configured at an angle relative to each other;
at least one mounting slot configured to receive the bridge; and
a rotatable arm; and;
a pulley;
an engaging member coupleable to the pulley;
a tube having a first side mountable to the clutch assembly and a second side;
an idler assembly mountable in the second side of the tube, the idler assembly further comprising:
an idler housing comprising a plurality of deflectors;
an idler shaft mountable in the idler housing, the idler shaft comprising a rounded portion and a plurality of idler hooks positioned on an end of the shaft opposite the rounded portion, the idler hooks oriented toward a central longitudinal axis of the idler shaft;
an idler spring positioned around a portion of the idler shaft;
an idler bracket further comprising:
a carrier configured to receive the rounded portion;
an adjuster for adjusting the position of the carrier; and
a tool retainer; and
a tool for adjusting the adjuster;
wherein the at least two clutch core hooks are configured to fit in the mounting holes, each of the clutch core hooks comprising an undercut portion configured to hold the clutch core in the bracket after insertion of the clutch core hooks in the mounting holes;
wherein the arm is configured to fit in the bridge after the bridge has been received in the mounting slot to lock the clutch core to the clutch bracket;
wherein the idler shaft is insertable into the housing such that the idler hooks move past the deflectors to lock the idler shaft in the idler housing; and
wherein the idler spring in combination with the hooks maintains the idler shaft in the idler housing.

12. The apparatus of claim 11 wherein the clutch core hooks are positioned above a horizontal midline of the clutch core.

13. The apparatus of claim 11 wherein the adjuster is a hex head screw and the tool is a hex key.

14. The apparatus of claim 11 further comprising a window covering coupled to the tube.

\* \* \* \* \*